Patented Apr. 18, 1939

2,154,996

UNITED STATES PATENT OFFICE 2,154,996

MANUFACTURE OF CALCIUM SULPHITE FILLED PAPER

Francis G. Rawling, Piedmont, W. Va., assignor to West Virginia Pulp & Paper Company, New York, N. Y., a corporation of Delaware No Drawing. Application June 24, 1938, Serial No. 215,587

11 Claims. (Cl. 92—21)

This application is a continuation-in-part of my application Serial No. 757,888, filed December 17, 1934.

This invention relates to a method of stabilizing calcium sulphite by preventing the conversion of calcium sulphite into calcium sulphate or removing or reconverting the sulphate when formed either in the course of producing the sulphite or in utilizing it or products containing it.

It has been found that in the production of calcium sulphite by the reaction, for example, between a suspension of milk of lime and an atmosphere rich in sulphur dioxide there is a tendency to convert a portion of the sulphite into calcium sulphate. This is apparently due to oxidation of the sulphite by means of the free oxygen present in the absorber in which the reaction takes place. Inasmuch as the atmosphere containing sulphur dioxide, used in the reaction, is most readily obtained by burning sulphur in an ample supply of air it is difficult to eliminate the excess oxygen in this atmosphere and thus prevent the objectionable conversion in that way. Similarly in the use of calcium sulphite as a filler in the manufacture of paper or a variety of other products it is ordinarily difficult to exclude oxygen in the course of mixing the sulphite with pulp or other ingredients. Accordingly there arises the same objectionable conversion of the sulphite into the sulphate.

Probably the most serious tendency toward conversion arises in the treatment of broke derived from paper containing calcium sulphite as a filler or a coating substance. In repulping such broke in a beater considerable opportunity is afforded for intimate contact with the air and this leads to oxidation of the calcium sulphite in the manner explained.

It will be appreciated that in the use of calcium sulphite for various purposes it will be desirable, for one reason or another, to maintain its purity as far as possible and prevent its conversion into the sulphate. For example in the manufacture of paper it will be found that the presence of calcium sulphite in conjunction with sizing ingredients such as rosin and alum leads to the production of a stable foam which accumulates at the slices and causes foam spots and breaks in the web of paper. This objectionable effect becomes cumulative due to the fact that more and more broke is developed and hence more and more foam is produced.

Now I have discovered that the conversion of calcium sulphite to the sulphate can be prevented or materially arrested or the action may even be reversed by the addition to the broke or to the suspension of calcium sulphite, or the mixture from which it is being formed, of a small quantity of a suitable anti-oxidant, or an agent which will tend to drive the reaction toward the production of calcium sulphite rather than the sulphate. For this purpose I have found that sulphites such as sodium and barium sulphite, and thiosulphates such as sodium or potassium thiosulphate are exceptionally satisfactory. The desirable action of these substances is probably due to the fact that they retard the oxidation of the calcium sulphite, or in the case of sodium sulphite it may be due to the fact that when any calcium sulphate is formed it reacts with the sodium sulphite to reconvert the sulphate into calcium sulphite. In any event the desired result of eliminating calcium sulphate from the final product is brought about. Glucose, sugar, and tin salts, such as stannous chloride, have also been found to have the desired effect, probably by way of preventing oxidation and these may, therefore, be used advantageously in lieu of all or part of the sodium sulphite or sodium thiosulphate. In fact any desired combination of these various substances may be employed.

From another angle of approach the conversion difficulty may be overcome by adding to the calcium sulphite, or to the material containing it or to the mixture from which it is formed, a suitable quantity of a salt of an acid whose calcium salt is less soluble than calcium sulphate in water, and which is capable of reacting with calcium sulphate. Salts of this character are sodium sulphite, sodium silicate, sodium phosphate, and the like, and also barium salts such as barium carbonate and barium sulphite. When these salts are present the reaction is driven in the direction away from the production of calcium sulphate and hence any of the sulphate previously formed is either reconverted to calcium sulphite or is otherwise removed. Excellent results may be obtained by the combined use of any of the substances just mentioned and sodium thiosulphate since the latter will inhibit oxidation and the further production of calcium sulphate while the former will reconvert or remove any of the sulphate previously formed.

In the use of any of the substances mentioned herein nothing is added or produced by reaction which will interfere with the use of the calcium sulphite in the manufacture of paper. The foaming difficulties arising from the presence of calcium sulphate will be overcome and no other deleterious effects will be produced in their place.

In the maceration and repulping of broke containing calcium sulphite it will ordinarily be desirable to add between 1 and 2%, based upon the weight of the broke, of the substance or mixture of substances for removing or preventing formation of calcium sulphate. If one or more of these substances is added to the milk of lime or the like used in the production of calcium sulphite or is added to or with the calcium sulphite being introduced into the paper stock the quantity required will vary with the particular circumstances but will ordinarily be between 2 and 10% of the weight of the lime or calcium sulphite. It will be understood, however, that the figures specified are simply illustrative of the more commonly desirable ranges and that beneficial results may be obtained from the use of greater or less quantities of the retarding or removing agents.

The particular manner and point of introducing the retarding or removing agent is not important so long as it is present at the time the calcium sulphite is exposed to the action of atmospheric oxygen. If it is used in the course of producing the calcium sulphite by the reaction of sulphur dioxide with milk of lime or a suspension of calcium carbonate in a suitable absorber the agent may, for example, be introduced in a water solution or suspension either directly into the absorber or into the lime or carbonate suspension prior to introduction of the latter into the absorber. When the action of the agent is desired in connection with the addition of calcium sulphite to paper as a filler, it may either be introduced into the filler before the latter is added to the paper stock or the two may be added to the stock at the same point, or in any event the agent should be added to the stock at or in advance of the point at which it is vigorously agitated with the filler in the presence of air. Ordinarily this will be at the beater. Similarly, in the use of the agent in connection with broke it will be most advantageous to add it at the broke beater.

While certain preferred agents and conditions have been specified in some detail it will be understood that various substitutions and modifications may be made without departing from the general principles and scope of the invention. The terms and expressions employed herein are to be regarded as terms of description and not of limitation.

I claim:

1. The treatment of paper pulp containing calcium sulphite as a filler, comprising the step of beating said pulp in the presence of water and a reducing agent in an amount effective for retarding oxidation of calcium sulphite to calcium sulphate in order to inhibit foaming.

2. The treatment of broke containing calcium sulphite as a filler to inhibit foaming, which comprises maceration of the broke in the presence of water and a reducing agent in an amount effective for retarding the oxidation of said sulphite into calcium sulphate.

3. In the beating of paper pulp in the presence of water and calcium sulphite as a filler, the step of adding an inorganic alkali metal salt in which the anions are composed of three atoms of oxygen and at least one atom of sulphur in an amount effective to arrest oxidation of the calcium sulphite.

4. In the beating of paper pulp in the presence of water and calcium sulphite as a filler, the step of adding an inorganic alkali metal salt in which the anions are composed of three atoms of oxygen and at least one atom of sulphur in an amount between 2 and 10% of the weight of the calcium sulphite present in the pulp to arrest oxidation thereof.

5. The treatment of paper pulp containing calcium sulphite as a filler, comprising the step of beating said pulp in the presence of water and a thiosulphate in an amount effective to arrest oxidation of the calcium sulphite.

6. The treatment of paper pulp containing calcium sulphite as a filler, comprising the step of beating said pulp in the presence of water, a thiosulphate and a sulphite other than calcium sulphite in an amount effective to arrest oxidation of the calcium sulphite.

7. The treatment of paper pulp containing calcium sulphite as a filler, comprising the step of beating said pulp in the presence of water and sodium thiosulphate in an amount between 2 and 10% of the weight of the calcium sulphite to arrest oxidation thereof.

8. The treatment of paper pulp containing calcium sulphite as a filler, comprising the step of beating said pulp in the presence of water and a sulphite other than calcium sulphite in an amount effective to arrest oxidation of the calcium sulphite.

9. In the beating of pulp in the presence of calcium sulphite as a filler, the step of adding sodium sulphite in an amount effective to arrest oxidation of the calcium sulphite.

10. The treatment of paper pulp containing calcium sulphite as a filler, comprising the step of beating said pulp in the presence of water and sodium sulphite in an amount between 2 and 10% of the weight of the calcium sulphite to arrest oxidation thereof.

11. The treatment of paper pulp containing calcium sulphite as a filler, comprising the step of beating said pulp in the presence of water and barium sulphite in an amount between 2 and 10% of the weight of the calcium sulphite to arrest oxidation thereof.

FRANCIS G. RAWLING.